United States Patent [19]

Hashimoto et al.

[11] 4,057,608
[45] Nov. 8, 1977

[54] PROCESS OF CONTINUOUS MANUFACTURE OF LIGHT-WEIGHT FOAMED CONCRETE

[75] Inventors: Akihiro Hashimoto, Atsugi; Shigeo Hayashi; Sadao Yamamoto, both of Yokohama; Hitoshi Chujo, Tokyo, all of Japan

[73] Assignees: Showa Denko Kabushiki Kaisha; Misawa Homes Institute of Research and Development, both of Tokyo, Japan

[21] Appl. No.: 678,375

[22] Filed: Apr. 19, 1976

[51] Int. Cl.² .................................................. B29H 7/20
[52] U.S. Cl. ........................................ 264/42; 106/75; 106/88; 106/315; 264/82; 264/333
[58] Field of Search ........................... 264/42, 82, 333; 106/75, 88, 315

[56] References Cited

U.S. PATENT DOCUMENTS

| | | |
|---|---|---|
| 3,723,145 | 3/1973 | Haldas .................. 106/315 X |
| 3,758,319 | 9/1973 | Ergene .................... 264/42 |
| 3,979,217 | 9/1976 | Sutton ...................... 106/88 |

*Primary Examiner*—Thomas P. Pavelko
*Attorney, Agent, or Firm*—Armstrong, Nikaido & Marmelstein

[57] ABSTRACT

Light-weight foamed concrete articles are advantageously manufactured in a continuous manner from a rapid setting hydraulic cement composition. The cement composition in the form of a dry powder and an aqueous foamed liquid containing a foaming agent and a setting retarder are separately and continuously introduced into a continuously stirred vessel where they are mixed into an aqueous foamed cement slurry within a short period of time. The foamed cement slurry is cast into the desired shape and, if desired, cured.

8 Claims, 1 Drawing Figure

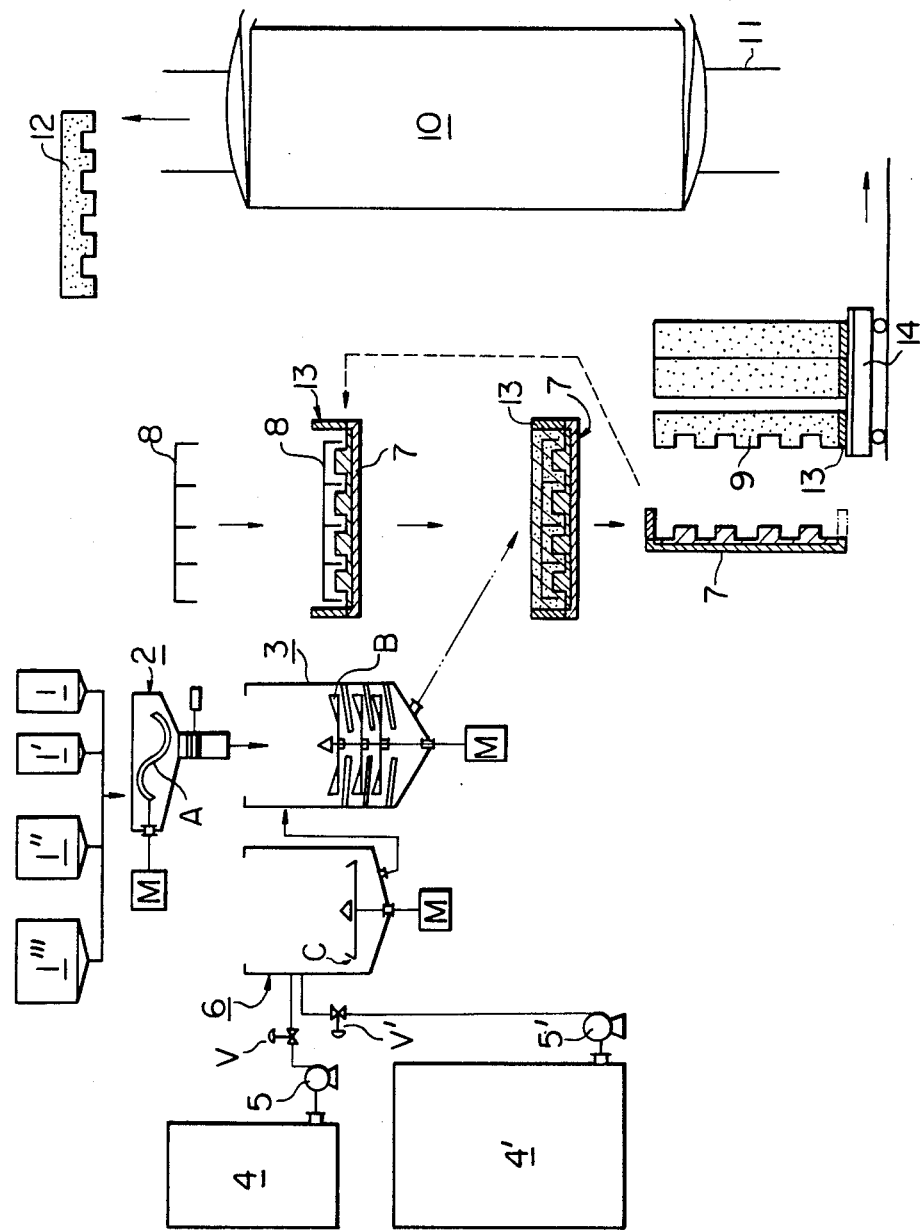

PROCESS OF CONTINUOUS MANUFACTURE OF LIGHT-WEIGHT FOAMED CONCRETE

FIELD OF THE INVENTION

This invention relates to a process wherein light-weight foamed concrete articles are continuously manufactured from a rapid setting hydraulic cement composition.

DESCRIPTION OF THE PRIOR ART

Light-weight foamed concrete articles, which include, for example, autoclaved light-weight concrete articles popularly called ALC for brevity, are characterized not only in that they are light-weight, thermally insulative and of a relatively improved strength but also by the low cost and short period of time required for construction. Therefore, light-weight foamed concrete articles are produced mostly in factories and widely used in the building and construction industries.

A variety of techniques have been employed to produce light-weight foamed concrete articles. Most known techniques are classified into two types, one of which is a mixfoaming process wherein a hydraulic cement composition, a foaming agent and water are mixed simultaneously with the foaming and the other of which is a pre-foaming process wherein an aqueous foamed liquid previously prepared is incorporated in an aqueous cement slurry. These known techniques may be advantageously employed for the manufacture of foamed concretes from a slow setting and hardening cement composition, but are not advantageous for the manufacture of foamed concretes from a rapid setting and hardening cement composition. Particularly, the preforming process is not practicable because it is difficult or impossible to uniformly mix an aqueous foamed liquid with an aqueous cement slurry before the cement begins to set. Further, the foamed concretes prepared from a rapid setting cement composition by these known techniques are poor in the extent of their foaming and the uniformity of their foams.

In the manufacture of foamed concretes from a slow setting cement composition, a long time is required for the hardening, particularly for the initial setting when the cement composition is initially set in a mold, leading to reduction of productivity. Although a plurality of molds may be used in order to enhance the productivity, this leads to an increase in the equipment cost. This increase in the equipment cost is conspicuous particularly when various concrete articles of different shape are manufactured, each in a small amount.

There is a continuing need in the art, therefore, for a process whereby light-weight foamed concrete articles are manufactured from a rapid setting cement composition particularly in a continuous manner.

It is an object of the present invention to provide a process for continuously manufacturing light-weight foamed concrete articles from a rapid setting hydraulic cement composition.

Other objects and advantages will be apparent from the following description.

SUMMARY OF THE INVENTION

In accordance with the present invention, there is provided a process for manufacturing light-weight foamed concrete articles which comprises the steps of:

separately introducing two materials in a continuous manner at stated flow rates into a continuously stirred vessel, one of the two materials being a rapid setting hydraulic cement composition in the form of a finely divided dry powder and the other being an aqueous foamed liquid containing a foaming agent and a setting retarder;

continuously withdrawing the foamed cement slurry, so prepared, from the vessel before the foamed cement slurry begins to set, and; then, placing the foamed slurry in a mold thereby to be cast therein.

One main point of the process of the invention is that an aqueous foamed cement slurry is prepared by mixing a finely divided dry powder of a rapid setting hydraulic cement composition with an aqueous foamed liquid containing a foaming agent and a setting retarder. This mixing may be called powder foam mixing. The aqueous foamed cement slurry so prepared is characterized in that the hydraulic cement composition particles are uniformly dispersed on the cells of the aqueous foamed liquid and, further, that such uniform dispersion can be prepared within a short mixing period, as compared with the aqueous foamed cement slurry prepared by the known mix-foaming or pre-foaming process hereinbefore mentioned.

DETAILED DESCRIPTION OF THE INVENTION

The term "rapid setting hydraulic cement composition" used herein means a hydraulic cement composition, which is capable of setting to a mass with sufficient strength to withstand demolding, at a temperature of 20° to 40° C, in a relatively short period of time, usually in the range of from several minutes to approximately thirty minutes. Such rapid setting hydraulic cement compositions include, for example, a mixture of alumina cement and calcium oxide and/or hydroxide, and a mixture of alumina cement, calcium oxide and/or hydroxide and other hydraulic material, which is capable of forming predominantly tobermorite group crystalline calcium silicate hydrate when cured at elevated temperature and pressure, such as Portland cement, slag cement, silica cement, fly-ash cement, natural cement, cement substitute and calcium silicate. The rapid setting hydraulic cement compositions also include a so-called JET cement which is a mixture of a calcium holoaluminate such as $11CaO.7Al_2O_3.CaF_2$ and calcium sulfate. One preferable example of the rapid setting hydraulic cement composition is a mixture of:

1. a hydraulic material capable of forming predominantly crystalline calcium silicate hydrate;
2. 10 to 35% by weight, based on the weight of said hydraulic material, of alumina cement, and;
3. 5 to 30% by weight, based on the weight of the alumina cement and expressed in terms of the weight of calcium hydroxide, of calcium oxide and/or calcium hydroxide.

A setting retarder used in the process of the invention includes, for example, oxycarboxylic acids such as citric acid and tartaric acid and their salts, and ketocarboxylic acids such as α-ketoglutaric acid and α-ketogluconic acid and their salts. The amount of the setting retarder is preferably 0.05 –1% by weight based on the weight of the rapid setting hydraulic cement composition.

A foaming agent used in the process of the invention includes surface active agents such as anionic sulfonate surface active agents, for example, alkyl arylsulfonic acid salts, alkylsulfonic acid salts, α-sulfonated fatty acid and α-sulfonated fatty acid esters, and saponin. The foaming agent may be used in an amount of 0.05 to 2.5% by weight based on the weight of the rapid setting hydraulic cement composition.

The process of the invention will be illustrated with reference to the accompanying drawing which schematically shows a flow sheet of the process of the invention.

The ingredients of the rapid setting hydraulic cement composition, for example, Portland cement, calcium hydroxide and alumina cement, are separately reserved in reservoirs 1, 1', 1", and 1"'. A predetermined amount of each ingredient is fed from the respective reservoir to metering feed apparatus 2 provided with stirring wing A rotated by motor M. The respective ingredients are uniformly mixed in a dry state in the metering feed apparatus 2, from which the mixture is continuously introduced at a predetermined flow rate to a continuous stirred vessel. The continuous stirred vessel may be, for example, a mixer 3 having a vertical rotating shaft with a plurality of stirring wings B.

An aqueous foaming liquid, containing a foaming agent and a setting retarder, and water are separately reserved in reservoirs 4 and 4', respectively. Said liquid and water are introduced by pumps 5 and 5', respectively, to foaming vessel 6 provided with stirring wings C. The amounts of the aqueous foaming liquid and water are controlled by valves V and V', respectively. An aqueous foamed liquid comprised of uniform minute bubbles is prepared in the foaming vessel 6 by flowing uniformly thereinto streams of the aqueous foaming liquid and water. The size and uniformity of the cells of the bubbles may be suitably controlled depending upon the shape and rotation speed of the stirring wings C. The aqueous foamed liquid is withdrawn from the vessel 6 by a pumping function of the stirring wings C and introduced at a predetermined flow rate to the continuously stirred vessel 3 in a continuous manner. In the vessel 3, the aqueous foamed liquid and the rapid setting hydraulic cement composition are continuously mixed into an aqueous foamed cement slurry. The amount of the foamed liquid is usually 50 to 70% by weight based on the weight of the cement composition.

The mixing in the continuously stirred vessel 3 should satisfy the following two requirements, that is, first, the aqueous foamed liquid and the cement composition are uniformly mixed with each other and, second, the cement composition does not set in the vessel 3. If the foamed liquid and the cement composition are not uniformly mixed, the resulting concrete is poor in appearance and mechanical strength. For the purpose of uniform mixing, it is desirable that, first, the aqueous foamed liquid be introduced into the vessel 3 in a manner such that the bubbles are not broken and no fresh air is introduced into the aqueous foamed liquid and, second, a considerable amount of shearing force is imparted to the mixture by stirring means. A preferable continuously stirred vessel is of the structure wherein fixed baffle plates are provided on the inner wall and the rotating shaft is provided with stirring wings as shown in the drawing.

If the cement composition is stagnant in the stirred vessel 3, it is liable to set therein. Such undesirable setting predominantly occurs by the time the cement powder is uniformly dispersed in the aqueous foamed liquid, rather than after the uniform dispersion is formed. Therefore, the shape and rotation speed of the stirring wings B should be set so that the cement powder and the aqueous foamed liquid are uniformly mixed within a short period of time. Further, the continuously stirred vessel should possess a structure such that the uniform mixture is capable of being withdrawn therefrom as soon as possible.

Thus, in accordance with the continuous process of the invention, a uniform aqueous foamed cement slurry can be prepared within a short period of time, e.g. five minutes.

The aqueous foamed cement slurry withdrawn from the continuously stirred vessel 3 is then introduced into mold 7 of a desired shape. If desired, prior to the introduction of the aqueous foamed cement slurry, a reinforcing iron rod 8 is set in the mold 7. The reinforcing iron rod 8 may be previously subjected to corrosion proof treatment. The foamed cement slurry sets due to the presence of alumina cement within a short period. The desired initial strength can be developed in approximately 10 to 30 minutes. The setting of the cement slurry should preferably be carried out at a temperature of not higher than 40° C, more preferably from approximately 20° to 40° C, because the initial strength becomes poor at a higher temperature.

The setting time is far shorter than that of a nonrapid setting hydraulic cement composition which is popularly used in the known continuous processes. Therefore, it is not necessary to use many molds.

The concrete article 9 removed from the mold 7 is, if desired, after being stored for a certain period of time, transferred to a curing autoclave 10. The curing autovlave 10 is shown in the drawing as a top view. The concrete article 7 may be transferred by using a truck 14 or a crane (not shown). The concrete article 9 is cured in the autoclave 10 to develop the maximum strength.

The curing may be effected in a moist atmosphere at room temperature or in a steam of normal pressure. However, in order to develop the maximum strength, prevent the production of cracks and improve the dimensional stability, it is preferable to effect the curing at a temperature of 150° to 200° C, more preferably 160° to 180° C, and a saturated steam pressure in the autoclave. The curing period is usually 3 to 10 hours. The cured light-weight concrete article 12 can then be transferred to storage facilities (not shown).

The invention will be further illustrated by the following examples.

EXAMPLE 1

The ingredients in the rapid setting hydraulic cement composition and the aqueous foaming liquid, used in this example, were as follows.

Rapid setting hydraulic cement composition: (parts by weight)
Portland cement; 100
Alumina cement; 25
Finely divided silica; 42
Calcium hydroxide; 5
Aqueous foaming liquid: (parts by weight)
Water; 100
Sodium citrate; 2
Polyvinyl alcohol; 3
Sodium dodecylbenzene sulfonate; 5

Using the continuous production arrangement shown in the accompanying drawing, concrete floor slabs were manufactured. The above-mentioned aqueous foaming liquid was introduced at a flow rate of 6.4 liter/min. from reservoir 4 to foaming vessel 6. Water was introduced at a flow rate of 57.5 liter/min. from reservoir 4' to the foaming vessel 6. The aqueous foaming liquid and the water were continuously mixed in the foaming vessel 6 thereby to foam an aqueous foamed liquid. This foamed liquid was continuously introduced into continuously stirred vessel 3. The above-mentioned rapid setting hydraulic cement composition was prepared in metering feed apparatus 2 and continuously introduced therefrom at a flow rate of 105 kg/min. to the stirred vessel 3. The continuously stirred vessel used was an improved viscose grinder type mixer with wings rotating at 420 rpm. An aqueous foamed cement slurry prepared in the vessel 3 was withdrawn therefrom at a flow rate of 200 liter/min.

A reinforcing iron rod 8 was set in mold 7 of the cross-sectional shape shown in the drawing, which had a width of 1,800 mm, a length of 3,600 mm and a depth of 250 mm and 100 mm. The above-mentioned aqueous foamed cement slurry was placed in the mold. About five minutes later the slurry began to set at about 20° C and thirty minutes later it exhibited a compressive strength of 7.0 kg/cm$^2$. When the compressive strength reached 7.0 kg/cm$^2$, the mold was turned up on one of its sides and a concrete floor slab 9 was removed from the parts of the mold 7 except for the side part 13. Thereafter, the concrete floor slab 9 with the side part 13 of the mold was cured in autoclave 10 at a temperature of 180° C and saturated steam pressure for a period of 8 hours.

The concrete floor slab exhibited good dimensional stability. There was little or no need for finishing it. It exhibited, after being dried, a specific gravity of 0.603, a compressive strength of 63.1 kg/cm$^2$, a bending strength of 22.0 kg/cm$^2$ and a compressive modulus of $3.02 \times 10^4$ kg/cm$^2$.

EXAMPLE 2

Following the general procedure set forth in Example 1, a concrete floor slab was manufactured wherein the following rapid setting hydraulic cement composition and aqueous foaming liquid were used. All other conditions remained substantially the same.

Rapid setting hydraulic cement composition: (parts by weight)
JET cement (11 CaO.7Al$_2$O$_3$.CaF$_2$ + CaSO$_4$); 100
Finely divided silica; 40
Aqueous foaming liquid: (parts by weight)
Water; 100
Polyvinyl alcohol; 3
Sodium dodecylbenzenesulfonate; 5
Sodium tartarate; 1

Thirty minutes after the casting of the aqueous foamed cement slurry at 40° C in mold 7, the concrete floor slab was demolded. The compressive strength was 6.5 kg/cm$^2$ at the time of demolding. The concrete floor slab had many minute cracks on its irregular surface, but the cracks were negligible from a standpoint of practical use. The concrete floor slab exhibited, after being dried, a specific gravity of 0.681, a compressive strength of 42.2 kg/cm$^2$ and a bending strength of 8.9 kg/cm$^2$.

What we claim is:

1. A process for manufacturing light-weight foamed concrete articles which comprises the steps of:
    separately introducing two materials in a continuous manner at stated flow rates into a continuously stirred vessel, one of the two materials being a rapid setting hydraulic cement composition in the form of a finely divided dry powder and the other being an aqueous foamed liquid containing a foaming agent and a setting retarder;
    continuously withdrawing the foamed cement slurry, so prepared, from the vessel before the foamed cement slurry begins to set, and; then,
    placing the foamed slurry in a mold thereby to be cast therein.

2. A process according to claim 1 wherein said rapid setting hydraulic cement composition is at least one mixture selected from the group consisting of a mixture of alumina cement and calcium oxide or hydroxide; a mixture of alumina cement, calcium oxide or hydroxide and a hydraulic material capable of forming predominantly tobermorite group crystalline calcium silicate hydrate when cured at elevated temperature and pressure, and; a mixture of calcium haloaluminate and calcium sulfate.

3. A process according to claim 1 wherein said setting retarder is at least one compound selected from the group consisting of oxycarboxylic acids, ketocarboxylic acids and their salts.

4. A process according to claim 1 wherein said setting retarder is used in an amount of 0.05 to 1% by weight based on the weight of the rapid setting hydraulic cement composition.

5. A process according to claim 1 wherein said foaming agent is at least one compound selected from the group consisting of alkylarylsulfonic acid salts, alkylsulfonic acid salts, α-sulfonated fatty acids, α-sulfonated fatty acid esters and saponin.

6. A process according to claim 1 wherein said foaming agent is used in an amount of 0.05 to 2.5% by weight based on the weight of the rapid setting hydraulic cement composition.

7. A process according to claim 1 wherein said aqueous foamed cement slurry is cast in a mold at a temperature of not higher than 40° C for a period of approximately 10 to 30 minutes.

8. A process according to claim 1 wherein the concrete cast in said mold is, after being demolded, cured in an autoclave at a temperature of 150° to 200° C and a saturated steam pressure.

* * * * *